(12) United States Patent  (10) Patent No.: US 7,128,374 B2
Mitropoulos  (45) Date of Patent: Oct. 31, 2006

(54) ENERGY ABSORBING DEVICE WITH TORSO DISPLACEMENT LIMITER

(75) Inventor: Christos Argyrios Mitropoulos, Sao Paulo (BR)

(73) Assignee: Chris Cintos de Seguranca Ltda., Sao Paulo (BR)

( * ) Notice: Subject to any disclaimer, the term of this patent is extended or adjusted under 35 U.S.C. 154(b) by 0 days.

(21) Appl. No.: 10/682,993

(22) Filed: Oct. 14, 2003

(65) Prior Publication Data

US 2004/0090107 A1    May 13, 2004

(30) Foreign Application Priority Data

Nov. 13, 2002    (BR) ................................. 0205059

(51) Int. Cl.
*B60R 21/00*    (2006.01)
(52) U.S. Cl. ..................................... 297/472
(58) Field of Classification Search ............... 297/472, 297/471, 475; 280/805; 242/379
See application file for complete search history.

(56) References Cited

U.S. PATENT DOCUMENTS

| 3,198,288 A | 8/1965 | Presunka | |
| 3,361,475 A | 1/1968 | Villiers | |
| 3,444,962 A * | 5/1969 | Lech | 188/371 |
| 3,765,700 A * | 10/1973 | Littmann | 297/471 |
| 4,027,905 A * | 6/1977 | Shimogawa et al. | 297/472 |
| 4,060,278 A * | 11/1977 | Maeyerspeer | 297/472 |
| 4,948,199 A * | 8/1990 | Weller | 297/472 |
| 5,005,909 A * | 4/1991 | Fohl | 297/472 |
| 5,344,096 A * | 9/1994 | Frei et al. | 242/379 |
| 6,835,899 B1* | 12/2004 | Wolfe et al. | 177/144 |

FOREIGN PATENT DOCUMENTS

| EP | 0 404 075 A | 12/1990 |
| EP | 0 909 684 A2 | 4/1999 |
| FR | 2 771 464 | 5/1999 |
| GB | 2 349 615 A | 11/2000 |

* cited by examiner

*Primary Examiner*—Milton Nelson, Jr.
(74) *Attorney, Agent, or Firm*—Nath & Associates PLLC; Gregory B. Kang; Derek Richmond

(57) ABSTRACT

An energy absorbing device with torso displacement limiter to be applied to any seatbelt model is characterized by a laminated plate conveniently fastened to a retractor body of a seatbelt. The device presents predetermined resistance and malleability characteristics and is provided with a convenient number of folds arranged in parallel with respect to each other and transversally with respect to the longitudinal axis of the plate. The folds, when submitted to a certain traction strength resulting from a strong collision or sudden deceleration of a vehicle in which they are being used, are gradually unfolded, causing a gradual increase in the length of plate.

6 Claims, 5 Drawing Sheets

ENERGY ABSORBING DEVICE WITH TORSO DISPLACEMENT LIMITER

As it is the technical area's knowledge, the seatbelts foreseen in motorized vehicles in general are destined to reduce injuries to users during a collision or sudden deceleration of the vehicle, since such belts hold the users to the seat, as well as avoid the mobility of their body onward, thus avoiding their crash against the flywheel or windshield of the vehicle (when in the front seats) or against the back of front seat (when in the rear seats).

There are various types of seatbelts among which the most used are those called "3-point belts" consisted of a lap belt (passing by the front of user's pelvic region) and of a diagonal belt (passing diagonally in front of the thorax, from the hip up to the opposite shoulder), anchored in three points inside the vehicle.

The retractable-type belts are also known, that is, belts with retractor. The spool of such belt retractor, where the belt webbing is rolled and unrolled, is equipped with a device that automatically restraints the webbing unrolling during steep curves or in case of sudden braking or collision. Such belts provide a larger comfort to the user, because they allow the natural moving of user's body, holding it in case of sudden stop or collision.

It is the technical area's knowledge that, in the event of collision or sudden deceleration of vehicle, at the same time in which the belt webbing must be locked to hold the user's body, it is necessary that a little part of such webbing be gradually released, so that the abrupt deceleration of the vehicle causes no bodily injuries to the user (since the body tends to remain in the displacement speed it was before).

In other words, after the activation of the webbing locking device, it is necessary that the webbing be released in such a length to dampen the abrupt stoppage, thus absorbing some of the energy.

For this purpose, the seatbelts must be equipped with a type of device that allows an additional displacement of webbing in case of strong collision. This displacement cannot exceed the maximum stipulated value. This value (maximum distance allowed for the additional displacement of the belt) is determined by the Safety International Standards and by the Brazilian Association of Technical Standards (ABNT).

In some models of belts, such additional displacement occurs in the locking axle, independently of the spool that rolls and unrolls the webbing. After the belt locking (internal axle), the mechanism on which the webbing is rolled starts releasing the webbing with a strength lesser than the determined one, thus allowing the webbing release to absorb the locking impact.

In order to determine the displacement limit, it is known devices called "air bags", which complete the seatbelt action, so that, in case of severe impacts, such devices are automatically activated, developing a flexible structure (by the gas compression contained therein), able to limit the displacement of occupants to the limits foreseen, consequently reducing the gravity of occupants' body impact inside the vehicle.

Such dampers, air bags or similar devices, act as torso displacement limiters, so that users do not reach the aggressive parts of the vehicle. Being so, the seatbelts used with the air bags have no limit of webbing release, once the air bag complies with the limit determination.

The device, object of this patent requirement, aims at absorbing energy, keeping the thorax displacement, limited to 300 mm for vehicles designed with no air bags. Its use is allowed with air bag, thus completing the safety, in case of the air bag failure.

Being so, aiming at the obtaining of an easy installation device, which attends the vehicle abrupt deceleration in case of seatbelt locking, the Depositor created this "ENERGY ABSORBING DEVICE WITH TORSO DISPLACEMENT LIMITER" to be applied in all and any seatbelt model, from the most simple up to the most sophisticated ones, independently of its constructive feature, including for vehicle models designed with air bag, in order to substitute this last one.

Such device consists of a laminated plate made of appropriate metal material with predetermined malleability and resistance characteristics. The plate is conveniently fastened to the seatbelt retractor and is equipped with enough number of folds. The format and any section of those folds, when submitted to a certain traction strength deriving from strong collision or sudden deceleration of vehicle, are gradually "unfolded" causing a gradual increase in plate length.

This way, the seatbelt additional displacement, necessary and required to attend and gradually absorb the sudden deceleration of vehicle that, until now, was carried out by the seatbelt webbing, came to be performed now by the own seatbelt retractor body, more specifically, by the plate installed therein, which, due to its specific resistance and malleability characteristics, does not deform when submitted to a low predetermined strength, but, from this determined strength, such plate is deformed (its folds are unfolded), thus increasing its length. This length corresponds to the distance of the seatbelt additional displacement, necessary for attending the sudden deceleration of vehicle and maximum limit of displacement.

The section, format and number of folds foreseen in the referred plate may vary, depending on the model of vehicle, always complying with the body deceleration requirements and the displacement limits for each model of vehicle.

Optionally, the energy absorbing device now renewed can also consist of an additional element, wired type, with restraint effect, also installed in the retractor body, element that provokes larger friction and, consequently, absorbs more energy.

With the current energy absorbing device, the seatbelt additional displacement, necessary and required to attend and gradually absorb the sudden deceleration of vehicle, is obtained, assuring the perfect working of seatbelt and providing total safety to users.

The device now renewed can be installed in any seatbelt model, becoming integral part of the set, already in its production line.

For illustration purpose, follows attached the drawings of current invention, through it the device will be better visualized:

Figure 1:
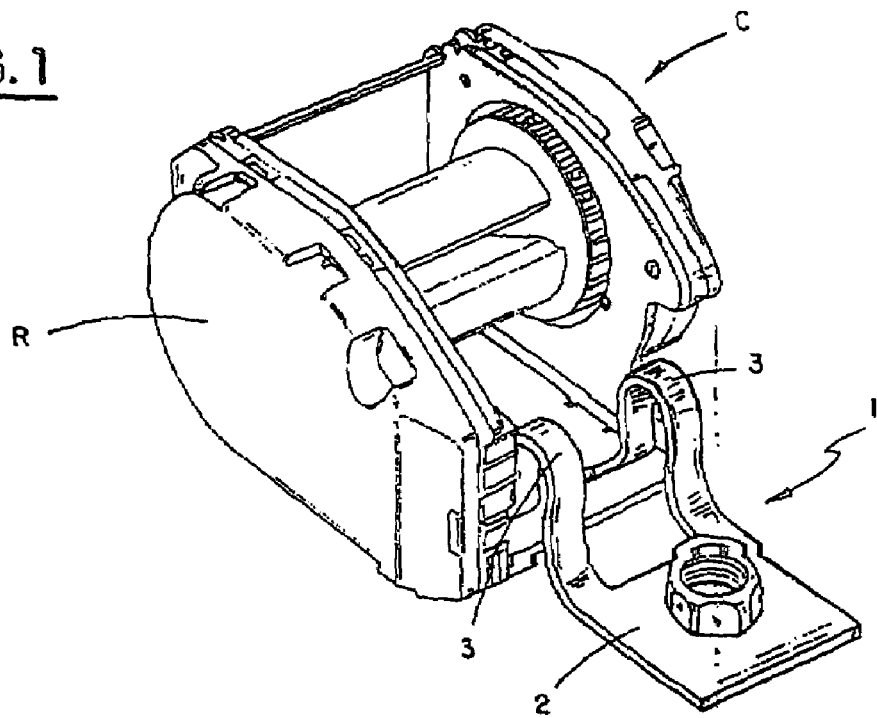
FIG. 1 is a schematic perspective of the seatbelt retraction, in which the installation of the Energy Absorbing Device now renewed is foreseen. It is illustrated in its original position, that is, having the folds in non-activated position.
Figure 2:
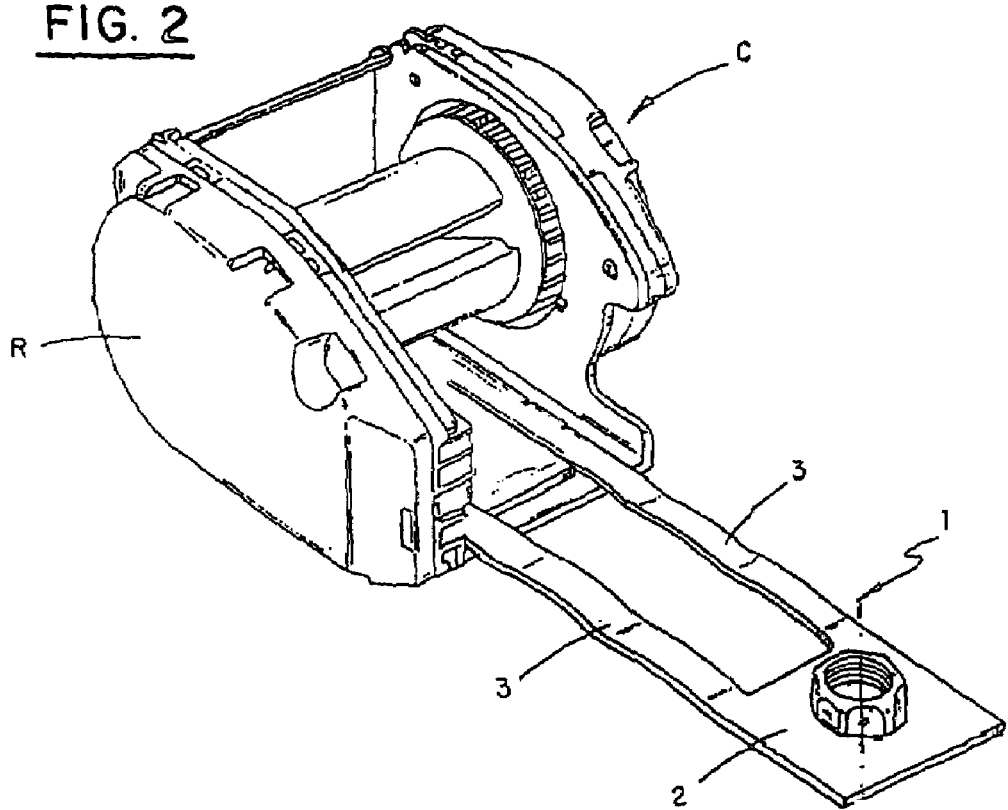
FIG. 2 is the same perspective of prior figure, now illustrating the energy absorbing device having its folds in activated position, that is, "unfolded". This position determines the seatbelt additional displacement to attend and gradually absorb the sudden deceleration of vehicle.

The object of this Invention Patent is an "ENERGY ABSORBING DEVICE WITH TORSO DISPLACEMENT LIMITER" such device (1) being applied to any seatbelt model (C), more specifically, in the body of retractor (R) consisted thereof. Such device (1) consists of a laminated plate (2) made of proper metal material, preferably treated steel, with predetermined resistance and malleability characteristics, provided with the convenient number of folds (3) arranged parallel among themselves and transversally in relation to the plate longitudinal axle (refers to FIG. 1). Those folds, when submitted to a certain traction strength deriving from a strong collision or sudden deceleration of vehicle, are gradually unfolded causing a gradual increase in the length of referred plate (2) (refers to FIG. 2).

Such plate (2) can be fastened to the retractor body (R) of seatbelts (C) by welding or riveting, or can form a sole part integrated to the retractor body.

The section, format and number of folds (3) foreseen in referred plate (2) may vary, depending on the model of vehicle, always complying with the body deceleration requirements for each model.

Figure 3:
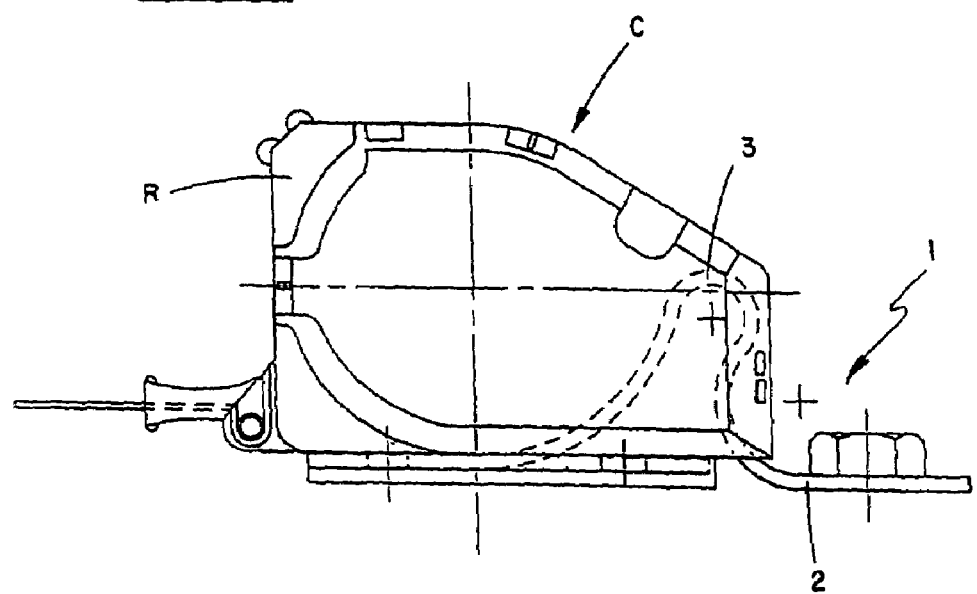
FIGS. 3 and 3A are, respectively, side view and top view of a retractor, in which the installation of the referred energy absorbing device is foreseen. It is in a possible installation form.
Figure 3A:
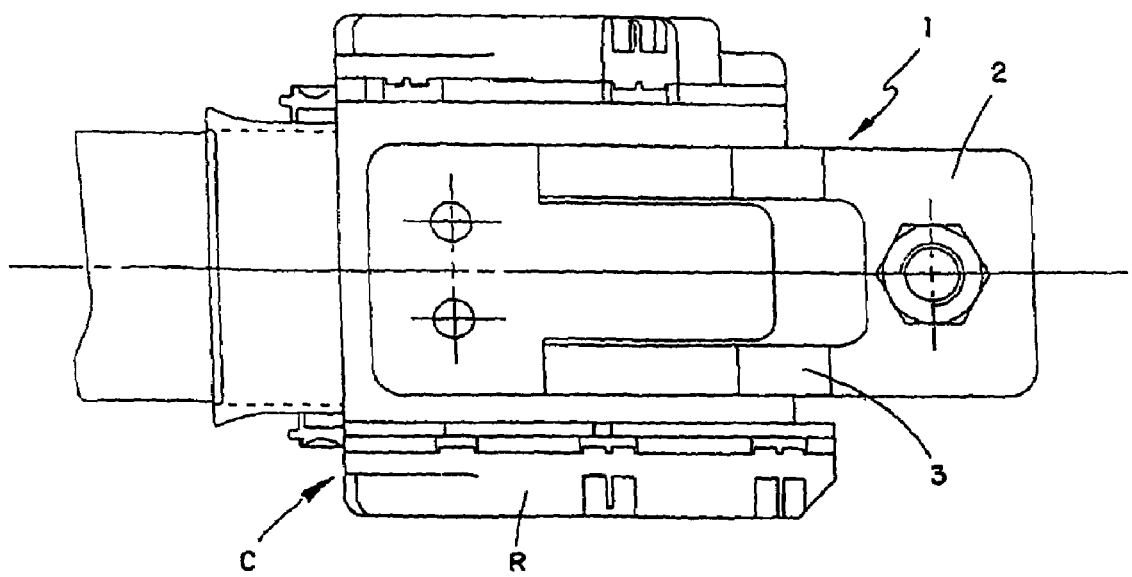
Figure 4:
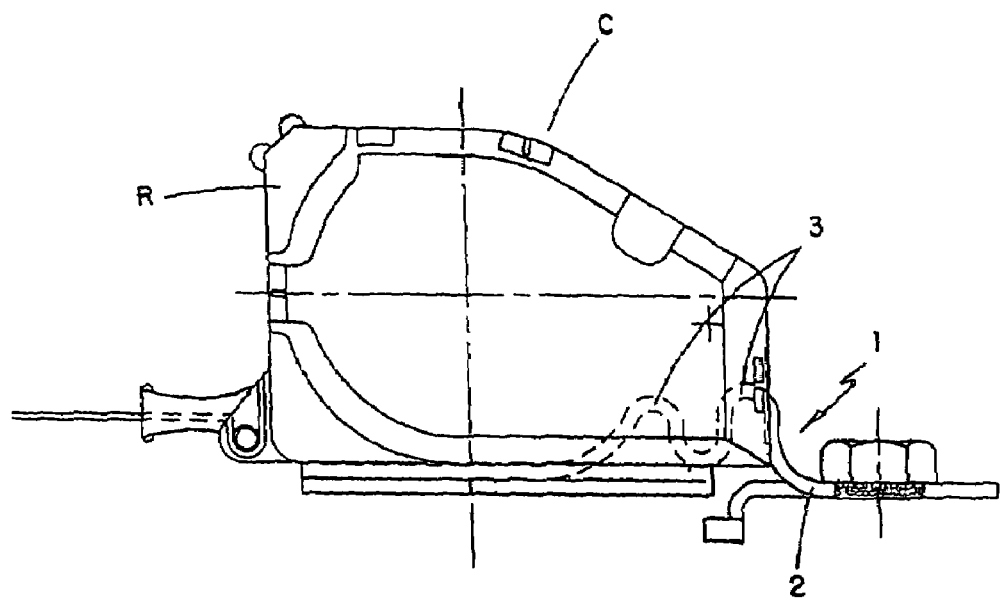
FIGS. 4 and 4A are also respectively side view and top view of a retractor, in which the installation of referred energy absorbing device is foreseen. It is in another possible installation form.
Figure 4A:
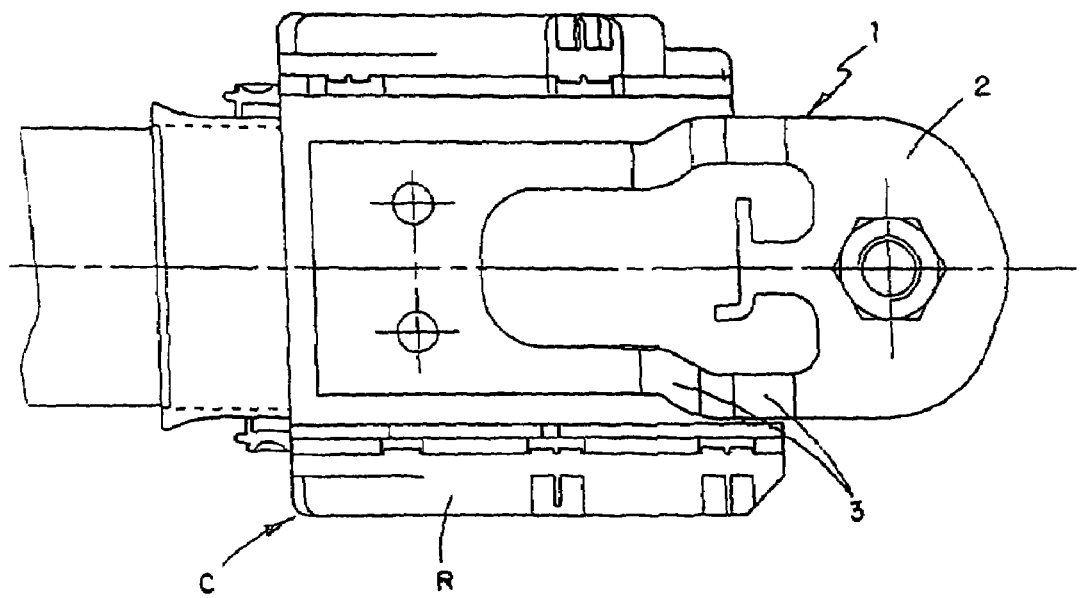
Figure 5:
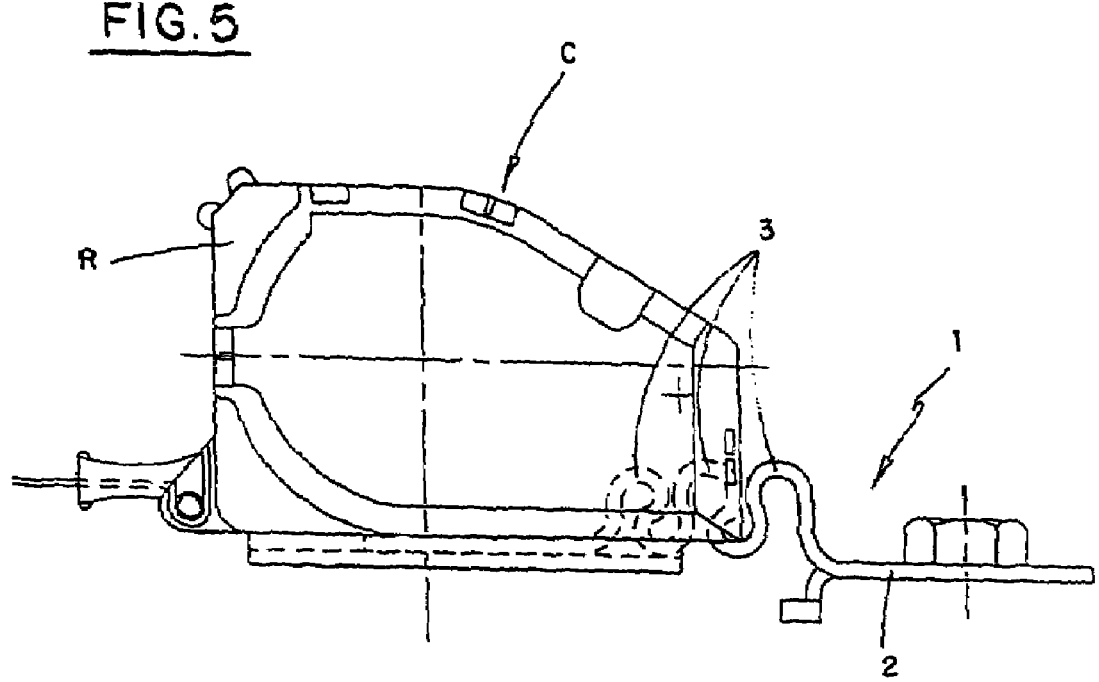
FIGS. 5 and 5A are, respectively, side view and top view of a retractor, in which the installation of referred energy absorbing device is foreseen. It is another possible installation form.
Figure 5A:
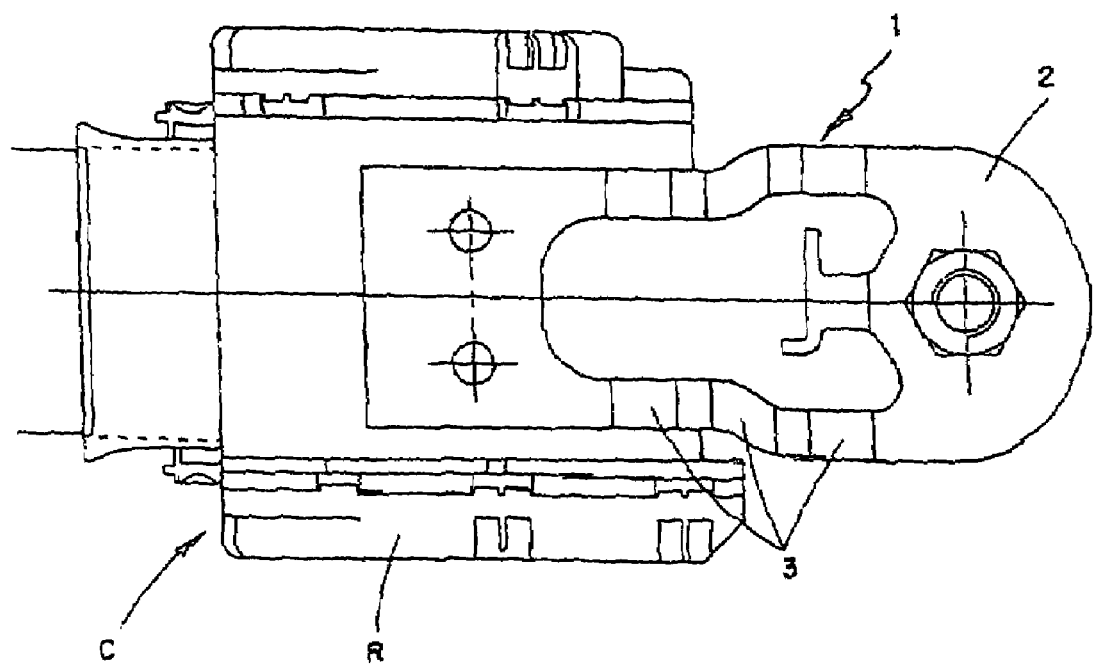

Only as example, FIGS. 3/3A, 4/4A and 5/5A illustrate three possible installation forms of the energy absorbing device (1) now renewed, showing the referred laminated plate (2) respectively with one, two and three folds (3), all of them basically having circular section.

Figure 6:
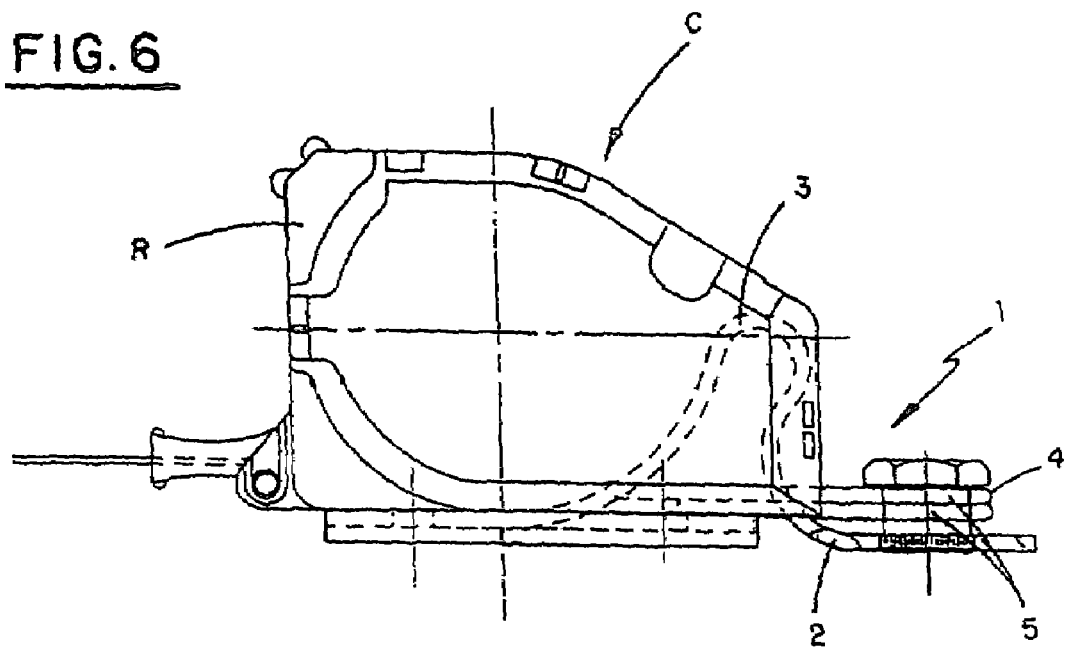
FIGS. 6 and 6A illustrates the same installation forms of FIGS. 3 and 3A, but foreseeing an additional element, with restraint effect, able to increase the friction.
Figure 6A:
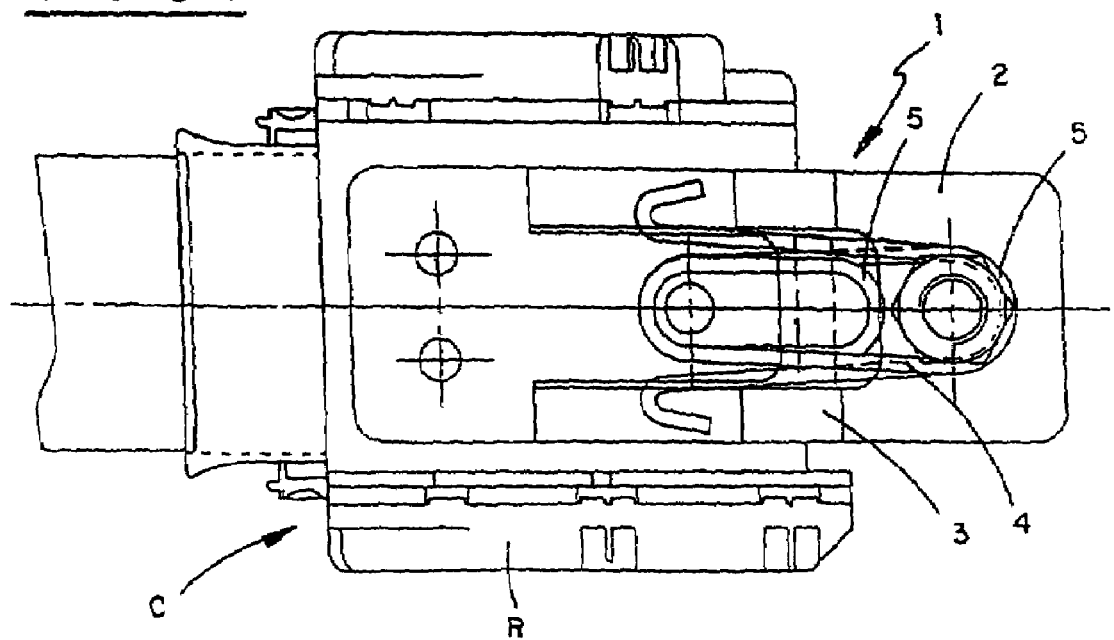

Optionally, the energy absorbing device now renewed can also consist of an additional element (4), wired type, with restraint effect, causing friction for the pre dimensioned energy absorption, also conveniently installed in the retractor body (refers to FIGS. 6/6A).

As the laminated plate (2), such element (4) presents predetermined resistance and malleability characteristics and is provided with a convenient number of turns (5) so that, when submitted to a certain traction strength resulting from strong collision or sudden deceleration of vehicle, are gradually unfolded, causing a gradual increase in the referred element (4) length.

Here, the section, format and the number of turns (5) foreseen in the referred element (4) may vary as well, depending on the model of vehicle, always complying with the body deceleration requirements of each model.

The device (1) now renewed can be installed in any seatbelt model becoming integral part of the set, already in its production line, and can be installed in vehicles designed with or without air bags, satisfying the best safety conditions for the occupants of these vehicles, providing an additional safety in case of air bag failure.

This way, the seatbelt additional displacement, necessary and required to attend and gradually absorb the sudden deceleration of vehicle, came to be provided by the own belt retractor (R) body, more specifically, by the energy absorbing device (1) now renewed and installed therein, configured by the laminated plate (2) and, optionally, by the element (4), which, by their specific resistance and malleability characteristics, do not deform while submitted to a certain strength. But, from that certain strength, such plate (2) and the element (4) deform through the unfolding of their folds (3) and the unrolling of their turns (5), respectively, thus increasing their lengths. Such length corresponds to the distance of the seatbelt additional displacement, necessary for attending the sudden deceleration of vehicle.

With the energy absorbing device described herein, the seatbelt additional displacement, necessary and required to attend and gradually absorb the sudden deceleration of vehicle, will assure the perfect working of seatbelt, providing total safety to users.

The invention claimed is:

1. An energy absorbing device with torso displacement limiter to be applied to any seatbelt (C) model characterized by
   a laminated plate (2) fastened to a retractor body (R) of a seatbelt, presenting predetermined resistance and malleability characteristics and provided with a plurality of folds (3) arranged parallelly among themselves and transversally in relation to a longitudinal axle of said laminated plate;
   said plurality of folds, when submitted to a certain traction strength resulting from strong collision or sudden deceleration of a vehicle, are gradually unfoldable, causing a gradual increase in the length of said laminated plate (2);
   further characterized by an additional element (4), wired type and with restraint effect, conveniently installed in the retractor body (R), having predetermined resistance and malleability characteristics and provided with a plurality of turns (5) that, when submitted to a certain traction strength resulting from strong collision or sudden deceleration of said vehicle, are gradually unfolded, causing a gradual increase in length of said additional element (4).

2. An energy absorbing device with torso displacement limiter as recited in claim 1 wherein said laminated plate is treated steel.

3. An energy absorbing device with torso displacement limiter according to claim 1, wherein said laminated plate (2) is fastened to the retractor body (R) to cause it to become an integral part of the retractor body.

4. An energy absorbing device with torso displacement limiter according to claim 1, installed in said vehicle, and characterized by said plurality of folds (3) of such laminated plate (2) having a section, format and number complying with body deceleration requirements and displacement limits for said vehicle in which said energy absorbing device is installed.

5. An energy absorbing device with torso displacement limiter according to claim 1, installed in said vehicle, and characterized by said plurality of turns (5) of said additional element (4) having a section, format and number, complying with body deceleration requirements and displacement limits for said vehicle in which said energy absorbing device is installed.

6. An energy absorbing device with torso displacement limiter according to claim 1, characterized by such additional element (4) made of treated steel.

* * * * *